United States Patent [19]

De Luca

[11] 4,151,392

[45] Apr. 24, 1979

[54] METHOD OF MANUFACTURING ELECTRICAL CONNECTOR

[75] Inventor: Carlo B. De Luca, Fairview, Pa.

[73] Assignee: Teledyne Industries, Inc., Los Angeles, Calif.

[21] Appl. No.: 777,039

[22] Filed: Mar. 14, 1977

[51] Int. Cl.$^2$ .............................................. B23K 33/00

[52] U.S. Cl. .................................... 219/118; 219/104; 219/105; 219/107

[58] Field of Search ................ 219/118, 104, 107, 105

[56] References Cited

U.S. PATENT DOCUMENTS

| | | | |
|---|---|---|---|
| 910,434 | 1/1909 | Thompson | 219/118 |
| 1,491,073 | 4/1924 | Wells | 219/107 |
| 2,114,837 | 4/1938 | Gillette | 219/118 |
| 2,352,754 | 7/1944 | Anderson | 219/105 |
| 2,677,746 | 5/1954 | Duch | 219/104 |
| 2,883,518 | 4/1959 | Zabka | 219/118 |
| 3,443,053 | 5/1969 | Luetzow | 219/118 X |

*Primary Examiner*—Richard R. Kucia
*Attorney, Agent, or Firm*—Ronald W. Reagin

[57] ABSTRACT

A method for manufacturing an electrical connector is disclosed in which the connector itself comprises an aluminum barrel member having a first and a second end, with the barrel member having a recess in its first end adapted to receive an electrical cable and a copper lead member extending axially out of its second end. The method comprises the steps of first forming a second recess in the second end of the barrel member, and forming one end of the copper lead member such that it includes a portion having a reduced cross-sectional area relative to the rest of the copper lead member. This end of the copper lead member is then inserted into the second recess in the barrel member, and electrical current is provided through the copper lead member and the barrel member while simultaneously applying force to bring the end of the copper lead member into engagement with the bottom of the second recess in the barrel member.

7 Claims, 3 Drawing Figures

METHOD OF MANUFACTURING ELECTRICAL CONNECTOR

This invention relates to electrical connectors, and more particularly to an improved method for manufacturing electrical connectors in which two dissimilar metals, such as copper and aluminum, are metallurgically joined by welding.

In the electrical power distribution art, distribution cables are usually made from from either copper or aluminum. However, those skilled in the art are well aware that copper is significantly more conductive than is aluminum, and as a result, in order for an aluminum cable to have the same current carrying capacity as a copper cable, it is necessary for the aluminum cable to be somewhat larger than the copper cable.

For many applications, this is not a significant factor, but there are some applications which, if designed to use a copper cable, presents some problems if an aluminum cable is used instead. For example, the seondary windings of most distribution transformers are copper windings, and the terminals on these transformers for attaching these windings to distribution cables are frequently designed to receive a cable of corresponding size. In these instances, if an aluminum distribution cable is brought to the transformer instead, it will be too large to fit into the connecting portions of the transformer. Similar problems are also sometimes encountered at electrical meter entrances or the like.

There is a type of electrical connector known to those skilled in the art which can be used to make connection from terminals designed to receive relatively smaller sized copper cables to relatively larger sized aluminum cables. This type of connector comprises a barrel member, usually made from aluminum, which has a recess along its axis at one end thereof which is adapted to receive the relatively larger aluminum cable. Projecting out of the opposite end of the barrel member of the connector is a copper lead member, or "pigtail," which extends for several inches out of the aluminum barrel member. In use, the copper lead member is placed in the terminal of the transformer or the like, and the aluminum cable is placed in the recess in the barrel member. A suitable crimping tool then is used by the electrical installer or lineman to crimp the barrel member down around the outside of the aluminum cable, thereby completing the electrical connection as desired.

The typical way of manufacturing such connectors in the prior art is to provide a second recess whose inside diameter is slightly larger than the outside diameter of the copper lead member, in the end of the aluminum barrel member from which the copper lead is to project. The copper lead member is then placed in this second recess, and a suitable crimping tool also crimps the barrel member down over the cylindrical surface of that portion of the copper lead member which is in this second recess.

Obviously, when this form of manufacturing technique is used, the electrical connection between the copper lead member and the aluminum barrel is merely a surface contact, or at least a very small amount of cold flowing between the metals when the barrel member is crimped over the lead member. Those skilled in the art have recognized that a better electrical connection between the copper lead member and the aluminum barrel member is desirable, and that such a better electrical connection could be made if a welding technique could be used to provide a metallurgical bond between the two members, instead of merely the mechanical bond.

For example, there is a type of welding known to those skilled in the art as butt welding in which the two members to be welded together are forced together, and electrical current is passed through them, which melts the two members at the point of contact and causes a metallurgical bond between them at that point. This type of welding technique has been attempted in the prior art to make electrical connectors such as are described above, but workers in the field have been unable to achieve a successful weld between the copper lead member and the aluminum barrel member which can be repeated consistently with adequate quality control.

It is accordingly the object of the present invention to provide an improved method for manufacturing electrical connectors of the type described above.

It is another object of the present invention to provide an improved method for manufacturing such electrical connectors which utilize butt welding techniques to provide a metallurgical bond between the copper and aluminum members.

It is yet another object of the present invention to provide such an improved method for manufacturing electrical connectors which can be repeated consistently with adequate control and consistent results.

In the work leading to the present invention, the present applicant concluded that the difficulty in obtaining suitable butt welds in manufacturing electrical connectors of the type described above was that he was attempting to weld a relatively smaller copper member to a relatively larger aluminum member, while the copper member had the substantially higher melting temperature. Aluminum melts at about 1220° F., while copper member melts at about 1981° F. As a result, when electrical current is passed between the two, the melting aluminum would absorb all of the energy from the electrical current and serve as a form of heat sink to keep the copper from reaching its melting temperature. As a result, while the aluminum would melt in the area of contact with the copper, the copper would not melt, or at least could not be made to melt repeatedly and under accurate controls, and as a result, adequate wetting between the metals could not be achieved.

Briefly stated, and in accordance with the presently preferred embodiment of the invention, a method for manufacturing an electrical connector is provided in which the connector itself comprises an aluminum barrel member having a first and a second end, with the barrel member having a recess in its first end adapted to receive an electrical cable and a copper lead member extending axially out of its second end. The method comprises the steps of first forming a second recess in the second end of the barrel member, and forming one end of the copper lead member such that it includes a portion having a reduced cross-sectional area relative to the rest of the copper lead member. This end of the copper lead member is then inserted into the second recess in the barrel member, and electrical current is provided through the copper lead member and the barrel member while simultaneously applying force to bring the end of the copper lead member into engagement with the bottom of the second recess in the barrel member. The portion of the copper lead member which has the reduced cross-sectional area has more heat generated therein by the passage of electrical current, and thus portions of both the copper and the aluminum are melted by the passage of the electrical current, and a welded metallurgical bond is formed between the barrel member and the copper lead member.

For a complete understanding of the present invention, together with an appreciation of its other objects and advantages, please refer to the following detailed descriptions of the attached drawings, in which.

Figure 1:
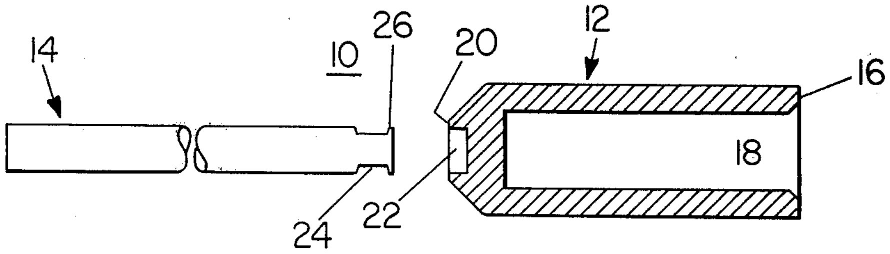
FIG. 1 shows the components, partially in cross-section, of an electrical connector prior to its assembly and welding in accordance with the present invention.

As is shown in FIG. 1, the electrical connector 10 is formed from a barrel member 12 which is usually made from aluminum, and a lead member 14, which is usually made from copper. The barrel member 12 includes a first end 16 which has a relatively large recess 18 extending along its axis. Recess 18 is adapted to receive an electrical cable, such as an aluminum cable, whose outside diameter is slightly smaller than the inside diameter of recess 18. When the electrical connector 10 has been manufactured and is used by lineman or installers in the field, the aluminum cable (not shown) is inserted in the recess 18, and the outer surface of barrel member 12 is crimped down upon the aluminum cable by suitable crimping tools, such as are known in the prior art.

The barrel member 12 also includes a second end 20 which has therein a second recess 12, which is also positioned along the axis of barrel member 12, but which is substantially smaller than is recess 18.

The second component of the electrical connector 10 is the lead member 14. In accordance with the present invention, the lead member 14 is formed so as to have a portion 24 at one end thereof which has a reduced cross-sectional area relative to the rest of the lead member 14. This end of lead member 14 also has at its very end portion a barrel shaped portion 26, whose cross-sectional area at its maximum position is approximately equal to the cross-sectional area of the rest of lead member 14. The length of the bell shaped portion 26 is relatively short, being substantially shorter than the depth of the aperture 22 in barrel member 12. Typically, the length of the bell shaped portion 26 might be 1/32 of an inch.

While the shown desired shape of the end of the lead member 14 can be formed by any suitable manner, in accordance with the presently preferred embodiment of the invention, it is formed by taking a copper lead member of uniform cross-sectional length and machining one end thereof to provide the portions 24 and 26 shown in FIG. 1.

The electrical connector 10 is assembled by inserting the end portion of the lead member 14 which includes the portions 24 and 26 into the second recess 22 of barrel member 12. As is shown in the drawings, the axial length of the portions 24 and 26 is greater than the depth of the recess 22. This assembly is then connected to a conventional butt welding machine, such as the Model AD-5 Welder sold by Mirco Products Company, 20 North Wacker Drive, Chicago, Illinois. The butt welder supplies a short pulse of high current, typically as high as 50,000 amperes for a period of less than one second. At the same time, it applies a force which varies, typically about 100 lbs to 1000 lbs, between the two members, thus insuring that any liquified metals resulting from the application of the electrical current are forced together, and also forging those portions of the metal that are in a semi-molten state into intimate contact. As is explained in more detail below, by insuring that the portion of the copper also becomes molten, the present invention insures that the aluminum also becomes molten, and the weld is made on a consistent and repeatable basis, despite variations in the welding machinery and in the material which are normally experienced in manufacturing operations.

At the time of the application of the electrical current and the force, the entire lead member 14 is forced closer to the barrel member 12 as the portions 24 and 26 of the lead member 14 are melted or softened, and these portions of the lead member 14 now completely fill aperture 22 and the barrel member 12.

The present invention achieves its desired result of assuring that both the copper and the aluminum are melted because of the provisions of the portion 24 of the lead member 14 which has the reduced cross-sectional area. In this reduced cross-sectional area portion, the electrical resistance is higher and when the welding current is applied to the assembly, there is a greater localized heating in this area. This localized heating, which occurs very quickly, enables some copper in this region and at the contact surface to melt and become semi-molten before the heat is conducted away by the aluminum barrel member, even though, as was noted above, the aluminum barrel member melts at a temperature greater than 700° F. less than does the copper.

Generally, copper is approximately 175% better in conducting electricity than is aluminum. Thus, in order to generate the greater heat energy in the copper member than in the aluminum member, using the same current, the copper member must be of a smaller cross-section by the ratio 1/1.75, or about 4/7. Thus, in the presently preferred embodiment of the invention, the ratio of the cross-sectional area of the portion 24 of the lead member 14 to the area of the end of the bell shaped portion 26, which is the area where the welding current is conducted from the copper lead member 14 into the aluminum barrel member 12 is no greater than 4/7. The relative cross-sectional areas is a function of the relative conductivity and melting temperatures of the two dissimilar metals being joined.

In practice it has been found that the method described above results in an actual melting of a portion of the aluminum and copper around the cylindrical end portion of the lead member 14, and thus a welded metallurgical bond between the metals over this area, and a sweating or soldering juncture in the area where the end of the bell shaped portion 26 contacts the bottom of the second recess 22 in the barrel member 12.

Figure 2:
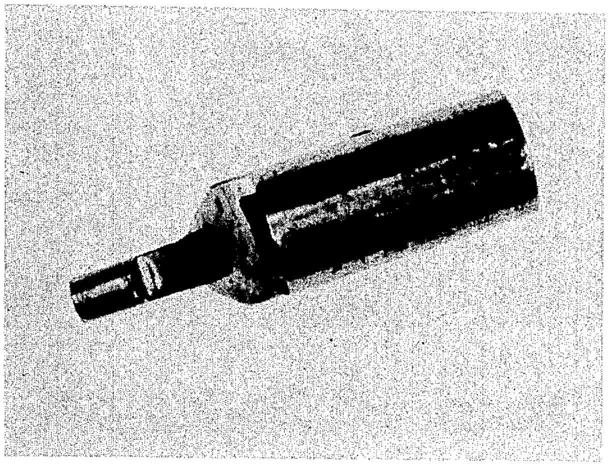
FIG. 2 is a photograph of an electrical connector, partially cut away, which has been manufactured in accordance with the method of the present invention and which shows the metallurgical bonding between the copper and aluminum.
Figure 3:
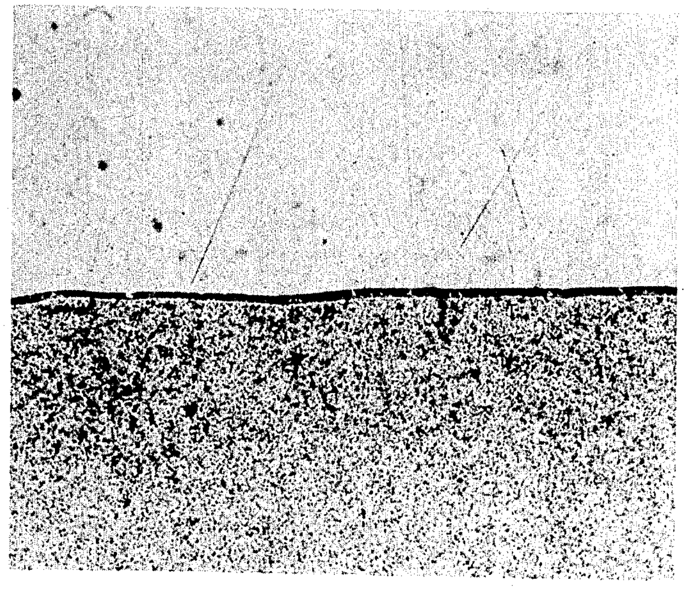
FIG. 3 is a micrograph of approximately 500 times magnification of the copper and aluminum bonding of the photograph of FIG. 2.

FIG. 2 shows a photograph of an electrical connector made in accordance with the method described above, with a portion thereof being machined away to show the junction between the copper lead member and the aluminum barrel. FIG. 3 is a micrograph of approximately 500 times magnification showing the junction between the copper and the aluminum metals. In FIG. 3, the relatively light upper portion is the copper and the relatively mottled lower portion is the aluminum. The relatively narrow dark band between the two shows where both metals have melted and formed a true metallurgical bond between the copper and the aluminum.

In practice, it has been found that the method described above can be used to manufacture electrical connectors of the type described above with consistant, controllable results. Tests have shown that such electrical connectors have better electrical conductivity and are stronger than connectors made in accordance with the prior art methods described above. For example, it has been found that it requires from 20% to 50% more force to pull the copper lead member 14 out of the aluminum barrel member 12, compared with similar electrical connectors made in accordance with the prior art. In addition, it has been found that the lead member 14 can withstand twisting and bending relative to the barrel member 12 indefinitely, with failure finally occurring by rupture of the lead member 14 outside of the barrel member 12 if enough torque is applied to the lead member. Typically, the lead member must be twisted through several complete revolutions relative to the barrel member before the lead member ruptures, still with no relative movement between the lead member and the barrel member at the point of metallurgical bonding.

While the invention is thus disclosed and the presently preferred embodiment described in detail, other variations and modifications of the invention will occur to those skilled in the art which still lie within the spirit and scope of the invention. It is thus intended that the invention be limited in scope only by the appended claims.

What is claimed is:

1. A method of manufacturing an electrical connector, the connector comprising an aluminum barrel member having a first and a second end, with the barrel member having a recess in its first end adapted to receive an electrical cable and a copper lead member extending axially out of its second end, the method comprising the steps of:

forming a second recess in the second end of the barrel member, forming one end of the copper lead member such that it includes a portion having a reduced cross-sectional area relative to the contact area between the copper lead member and aluminum barrel member, inserting the one end of the copper lead member into the second recess in the barrel member, and simultaneously passing electrical current through the copper lead member and the barrel member and applying force to bring the end of the copper lead member into engagement with the bottom of the second recess, whereby greater localized heating of the copper lead member occurs in the portion having a reduced cross-sectional area because of its higher resistance and portions of both copper and aluminum are melted by the passage of the electrical current and a welded metallurgical bond is formed between the barrel member and the copper lead member.

2. The method of claim 1 in which the length of the portion of the copper lead member which has a reduced cross-sectional area is longer than the depth of the second recess in the barrel member.

3. The method of claim 1 in which the cross-sectional area of the portion of the copper lead member is no greater than 4/7 of the cross-sectional area of the contact area between the copper lead member and the aluminum barrel member.

4. The method of claim 1 in which the contact area between the copper lead member and the aluminum barrel member is formed between the end of the lead member and the bottom of the second recess and has an area substantially equal to the cross-sectional area of the unreduced portion of the lead member.

5. The method of claim 4 in which the one end of the copper lead member is further formed to include a bell-shaped portion at its end, with the maximum cross-sectional area of the bell shaped portion being substantially equal to that of the rest of the copper lead member, and with its length being substantially less than the depth of the second recess in the barrel member.

6. A method of butt welding two members formed from dissimilar metals having different melting temperatures which comprises the steps of:

providing a connecting portion in the member having the higher melting temperature, the connecting portion having a contact area adapted to contact the second member and having a portion having a reduced cross-sectional area relative to the contact area, bringing the contact area of the first member into contact with the second member, and simultaneously passing electrical current through the two members and applying force to keep the two members in engagement while the electrical current passes between the members and melts portions of them, with greater localized heating of the first member occurring in the portion having a reduced cross-sectional area because of its higher resistance, thereby causing a metallurgical bond between the members.

7. A method of butt welding two members formed form dissimilar metals having different electrical conductivity which comprises the steps of:

providing a connecting portion in the member having the higher electrical conductivity, the connecting portion having a contact area adapted to contact the second member and having a portion having a reduced cross-sectional area relative to the contact area, bringing the contact area of the first member into contact with the second member, and simultaneously passing electrical current through the two members and applying force to keep the two members in engagement while the electrical current passes between the members and melts portions of them, with greater localized heating of the first member occurring in the portion having a reduced cross-sectional area because of its higher resistance, thereby causing a metallurgical bond between the members.

* * * * *